(12) United States Patent
Hazy (10) Patent No.: US 8,468,210 B2
(45) Date of Patent: *Jun. 18, 2013

(54) AUDIO MESSAGE DRIVEN CUSTOMER INTERACTION QUEUING SYSTEM

(76) Inventor: Robert Joseph Hazy, El Dorado Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/958,424

(22) Filed: Dec. 2, 2010

(65) Prior Publication Data

US 2011/0072111 A1    Mar. 24, 2011

Related U.S. Application Data

(63) Continuation of application No. 10/377,444, filed on Mar. 3, 2003, now Pat. No. 7,895,283.

(60) Provisional application No. 60/363,506, filed on Mar. 8, 2002.

(51) Int. Cl.
*G06F 15/16* (2006.01)
(52) U.S. Cl.
USPC .......................... 709/207; 709/206; 379/67.1
(58) Field of Classification Search
USPC ............... 709/206, 217, 240; 379/1.02, 1.03, 379/265.01, 265.02, 265.05, 265.07, 266.01; 370/270
See application file for complete search history.

(56) References Cited

U.S. PATENT DOCUMENTS

| 6,212,535 | B1 * | 4/2001 | Weikart et al. | 715/207 |
|---|---|---|---|---|
| 6,377,944 | B1 * | 4/2002 | Busey et al. | 1/1 |
| 6,934,277 | B1 * | 8/2005 | Werve et al. | 370/352 |
| 7,346,671 | B2 * | 3/2008 | Hankejh et al. | 709/219 |
| 2001/0047270 | A1 * | 11/2001 | Gusick et al. | 705/1 |
| 2002/0196929 | A1 * | 12/2002 | Smith et al. | 379/266.01 |
| 2003/0177009 | A1 * | 9/2003 | Odinak et al. | 704/260 |

* cited by examiner

*Primary Examiner* — Mohamed Ibrahim
(74) *Attorney, Agent, or Firm* — Ash Tankha; Lipton, Weinberger & Husick (57) ABSTRACT

This application is for an audio message-driven customer interaction queuing system for any public web page to allow web page visitors to utter questions into a browser-resident recorder application. The questions queue along with originating web page information and are distributed to customer service agents. These agents research the question, using web page as reference, and respond with an audio message, played upon the recorder application by the user after some brief service interval. The invention includes client, server and agent elements. The Client resides in a standard browser on a PC and consists of a Macromedia Flash interface driving an ActiveX control and JavaScript using audio encoding/decoding codecs. The Server consists of Java Servlets, Enterprise Java Beans, a web and application server and generic database technology. The Agent consists of a browser partitioned into areas to accommodate customer URL viewing, Connection Management, and a Client for message playback/record/send functions.

8 Claims, 11 Drawing Sheets

AUDIO MESSAGE DRIVEN CUSTOMER INTERACTION QUEUING SYSTEM

CROSS-REFERRENCE TO RELATED APPLICATIONS

This application is a continuation application of U.S. patent application Ser. No. 10/377,444, filed on Mar. 3, 2003 now U.S. Pat. No. 7,895,283 in the United States Trademark and Patent Office, which claims benefit of provisional patent application No. 60/363,506 filed on Mar. 8, 2002 in the United States Trademark and Patent Office.

BACKGROUND OF THE INVENTION

1. Field of the Invention

This invention relates to software systems, specifically systems designed to deliver customer service over the worldwide web and other networks.

The present invention relates generally to Customer Relationship Management (CRM) applications and more specifically it relates to an audio message driven customer interaction queuing system (AMDCIQS) for audio-enabled web pages in a retail or customer support context. More generally, the system may include message types such as audio (primarily voice), video, text (email and SMS (short Messaging Service)) and fax. More specifically, this system primarily allows web page visitors to utter questions into a browser-resident voice recorder application akin to a Walkie-Talkie, queues these questions along with the originating web page URL and user data before distributing them to customer service agents. These Agents can then research the question, using the web page as reference, and respond with an audio (or other) message, played upon the recorder application by the User after some brief service interval.

2. Description Of The Prior Art

It can be appreciated that CRM applications have been in use for years, and have become a natural melting pot for traditional telephony customer interaction and newly emerging web contact paradigms such as email, Voice Over Internet Protocol (VoIP), web call-back request, and text chatting. Of these, voice applications are of particular interest in this discussion, but the other channels offer insight into the customer service equation as their service characteristics become germane to this invention.

The main problem with conventional CRM web applications is that their support for voice interaction is unsatisfactory, and voice interaction remains the channel preferred by customers and the most effective and proven channel for sales and support. Existing web-oriented customer service involves a compendium of textual and visual self-help material designed to deflect extraneous call traffic from call centers. When interaction is actually desired by customers on the web, their options include sending email to the vendor, asking for an immediate call back from the vendor, text chatting with customer support agents, or opening a VoIP voice session with an agent. The weaknesses of each of these methods appear in this discussion.

Email contact into CRM applications is managed on the user side through web-forms and/or email programs designed to help users isolate issues for discussion, and frequently targets groups within the vendor using the To: address to aid in triage of incoming service requests. In the vendor system, an ERMS or Email Response Management System aggregates the incoming email traffic, performs routing analysis over the mail, and routes them to service queues. In the contact center, managers devise staffing models to address this traffic in addition to the more prevalent voice traffic that besets the typical contact center. Service Level Agreements, or SLAs for email contacts vary widely, from as little as a few minutes for an automatically generated "receipt" response, to days or weeks. On average, the response cycle exceeds 24 hours. The net effect of this has been to damage the customer's expectation for timely service on this channel best characterized as a text message driven system.

Web Call Back is a second common form of customer interaction on websites and involves the voice medium. The drawbacks of this approach are threefold however. First, the User needs to wait for a call back, which can take a variable amount of time. The User generally receives no notification of expected wait time, further undermining the expectation for timely or "worthwhile" service. Second, the User may need to drop the ISP connection to the Internet in order to receive the call. This is likely to disrupt the context for the question, and is likely to result in no transaction whatsoever. The third weakness of this approach is that the staffing model required to support web call back is identical to an out-dialing telemarketing application. As such, because the calls are real time and have indeterminate length, the model for staffing a center to field such calls is expensive. Add to that the expense of traditional call center infrastructure, and the attractiveness of this contact channel diminishes.

Text Chatting customer interaction shares some of the same weaknesses as Web Call Back from a staffing perspective. The primary weakness of this approach is that the staffing model required to support text chat is identical to an out-dial telemarketing application. As such, because the conversations are real time and have indeterminate length, the model for staffing a center to field such calls is expensive. Another problem with text chat is that it requires text entry for users which is a frequent barrier to usage. A third problem with it is the User must wait in a queue before receiving service, further diminishing the User's excitement impulse to establish contact.

VoIP is the last form of current customer interaction over the web and shares the queuing weaknesses of the approaches above as well as their expensive staffing models since it is connection oriented. This means that users on either end of a connection must participate at the same time, unlike a messaging application. Additionally, VoIP infrastructure is expensive to acquire and manage. Finally, and most fatefully, the quality of VoIP remains a problem for most users. Even with the quick saturation of broadband services into the consumer market, underlying limitations of shared Internet communications without Quality of Server (QoS) guarantees makes VoIP unreliable and unsatisfying for everyone. VoIP voice fidelity is generally so bad that the pay-services for VoIP suffer due the prevalent belief it is inherently free because of its poor quality. For these reasons, the adoption curve for VoIP has been disappointing, even though it will ultimately be a useful contact channel. The horizon for this usefulness is still several years away at earliest. QoS issues aside, VoIP will always necessitate an expensive staffing model and infrastructure to support. And regardless of network performance improvements, any connection-oriented service technology forces customers to "queue" before asking their questions.

Though there has been no application to date of Instant Messaging technology for CRM, it is worth mentioning as it most closely resembles aspects of the invention under discussion here. Instant Messaging allows users to send text to one another, and permits audio and video real-time streaming. These applications, however, function in a peer-to-peer mode (even though intermediated by a host server) in which users seek out specific other users. What has not happened, though, is the application of this mode of interaction for N:1 (N to one) customer service, and more particularly, not for voice. It is the combination of the last two features that drives a portion of the novelty of this application.

While these devices may be suitable for the particular purpose to which they address, they are not as suitable for voice-enabled web customer service as is the technology represented here. The net result of the above discussion is a pastiche of customer dissatisfaction and customer service organization frustration.

On the customer side, the interaction is marked by inconvenience, waiting, unnatural interaction paradigms employing text input and general technical obstacle. The result is diminished excitement on the part of consumer, reduced patience with inhumane technology solutions that solve nothing, drive frustration, and ultimately, undermine the transaction itself On the customer service organization side, center managers are frustrated at mounting expenses from increasing staffing models, new infrastructure costs that deliver under whelming performance, and burnt out customer service agents. The net result of the overload and expense pressure is a retreat from solving the problem.

In these respects, a voice message driven customer interaction queuing system according to the present invention substantially departs from the conventional concepts and designs of the prior art, and in so doing provides an apparatus primarily developed for the purpose of voice-enabled web pages in a retail or customer support context, allowing web page visitors to utter questions into a browser-resident recorder application akin to a Walkie-Talkie. These questions are then queued along with originating web page information and user data and distributed to customer service agents. Agents can then research the question using the web page as reference, and respond with an audio (or other) message.

Objects and Advantages

To ease the acronym burden in this discussion, AMDCIQS is hereafter replaced with the name "Blurt", the inventor's name for the technology herein described. In view of the foregoing disadvantages inherent in the known types of CRM applications now present in the prior art, the present invention (Blurt) provides a new audio message driven customer interaction queuing system with the following advantages:

The primary feature of Blurt is the ability of the Blurt player to operate without the need to queue with customer service and wait for an agent before satisfying the customer's desire to ask a question. This results in the following advantages:

(a) Users can immediately record messages (of various media types) at the moment of conception.

(b) Users can issue messages spontaneously into a customer service organization without waiting for agents to become available first.

(c) Disruption is minimized to user routine.

(d) Impulse contact is enabled.

(e) Contact model is simplified for user.

A second primary feature of Blurt is that it is not connection-oriented, relying on messages as a medium of exchange versus persistent real-time telecom sessions (connections). The connectionless feature leads to a several advantages in the customer service center hosting Blurt:

(a) Load balancing for service requests.

(b) Reduced staffing requirements in service center.

(c) Audio fidelity improvement of messages (versus VoIP).

(d) Elimination (or avoidance) of expensive infrastructure (VoIP switches, ACDs and PBX switches).

The general purpose of the present invention, which will be described subsequently in greater detail, is to provide a new voice message driven customer interaction queuing system that has many of the advantages of the CRM applications mentioned heretofore and many novel features that result in a new voice message driven customer interaction queuing system which is not anticipated, rendered obvious, suggested, or even implied by any of the prior art CRM applications, either alone or in any combination thereof.

This system can be used to voice-enable web pages in a retail or customer support context, allowing web page visitors to utter questions into a browser-resident recorder/player application akin to a Walkie-Talkie. It then allows customers to continue browsing the website or shopping while customer service formulates their answer. Finally, it allows the user to receive the answer and listen to it on the radio-like device. This response cycle is designed to occur in less than about 2 minutes, which is usually less time than spent navigating a traditional call center phone menu. The ease of use, immediacy, instant familiarity with the device paradigm, and quick response time combine to make it easier for people to make a buying decision or to get help when they need it, thereby increasing transaction success rate.

The following business objectives succinctly list the high-level key issues addressed by the invention:

(a) The primary business objective is to increase on-line sales effectiveness by targeting causes for transaction abandonment.

(b) A second primary business objective is to enable spontaneous customer voice contact via the web order to establish sales opportunities and exploit the web sales channel (c) Another business objective is to increase voice quality of web-transmitted voice such that the channel becomes acceptable to agents and customers (d) Another business objective is to enable impulse contact from customers in order to establish sales opportunities (e) Another business objective is reducing call center staffing expenses (f) Another business objective is to reduce infrastructure and PSTN toll service costs.

(g) Another business objective is to relieve the "real time" constraints placed upon customer service organizations and the expense that results.

The technical process behind the invention addresses these needs. It allows web page visitors to utter questions into a browser-resident recorder application that visually resembles and functions like a Walkie-Talkie. These questions are queued with originating web page information and user data and distributed to customer service agents. These agents then research the question using the web page as reference, and respond with an audio message. The web page visitor plays the response upon the browser-resident player.

It should be noted that this voice message driven interaction paradigm applies to non-web applications as well. Traditional telephone customer service operations could employ this message-driven model as well, employing the back-end queuing function described above to achieve similar cost economies in the customer service operation to those described here in the web context.

The following technical objectives support the stated business objectives:

(a) A primary object of the present invention is to provide a voice message driven customer interaction queuing system that will overcome the shortcomings of the prior art devices.

(b) Another object is to provide a voice message driven customer interaction queuing system that enables voice message driven customer interaction queuing for persons desiring voice-oriented customer service on websites.

(c) Another object is to provide a voice message driven customer interaction queuing system that allows web site visitors to utter questions into a browser-resident recorder application akin to a Walkie-Talkie 2-way radio, and send these messages to customer service for timely handling.

(d) Another object is to provide a voice message driven customer interaction queuing system that offers a method for email-style store and forward service delivery for audio messages with a brief service interval (less than 1 minute message roundtrip is possible), supported by a reduced staffing model compared to that for connection-oriented call-handling contact centers.

(e) Another object is to provide a voice message driven customer interaction queuing system that queues audio questions along with originating web page URL and user information and then distributes these messages and supplemental data to customer service agents.

(f) Another object is to provide a voice message driven customer interaction queuing system that allows customer service agents to respond to questions with audio messages and route these answers back to the users initiating contact.

(g) Another object is to provide a server-side agent selection process for distribution of messages based upon topic of the originating URL, user data, availability of agent, work load of agent, and immediate prior history servicing the specific customer.

(h) Another object is to leverage platform-independent development tools that facilitate cross-platform portation of the invention.

(i) Another object is to develop DBMS independent architecture through the elimination of DBMS specific implementation features such as stored procedures and triggers.

(j) Another object of the invention is to create an architecture easily assimilated into either IT infrastructure of an end customer, or into the product suite architecture of a vendor in the CRM or CTI space.

(k) Another object is to provide continuity of service to the customer by assigning subsequent customer messages to the same agent until the session is concluded.

(l) Another object is to provide an administrative facility for the creation, management and deletion of agent accounts, user data profiles, and message management.

(m) Another object is to provide a voice message driven customer interaction queuing system that offers high voice quality by using client-side multi-media codec services for voice messages transported via the Internet.

(n) Another object of the invention is to provide a system that compresses voice into acceptably small files for transfer in an acceptably timely manner over a slow speed dialup connection at 28.8 kbps.

(o) Another object of the invention is to provide a user interface that downloads to the client browser in an acceptably timely manner over a slow speed dialup connection at 28.8 kbps.

(p) Another object of the invention is to provide a user interface that immediate taps into familiar user expectations by using a "Walkie-Talkie-like" interface requiring minimal explanation to operate successfully.

(q) Another object of the invention is to provide a user interface with toy-like appeal that encourages usage by leveraging user curiosity.

(q) Another object is to provide a voice message driven customer interaction queuing system that works independently of the variable quality of internet transport resulting from network latency (transport delay) and jitter (variation in latency), thereby increasing voice fidelity dramatically.

Other objects and advantages of the present invention will become obvious to the reader and it is intended that these objects and advantages be within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated.

SUMMARY OF THE INVENTION

In accordance with the present invention, an Audio Message Driven Customer Interaction Queuing System generally comprises client, server and agent elements designed to allow users to spontaneously create and issue messages into a web-based customer service facility without queuing beforehand.

There has thus been outlined, rather broadly, the more important features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Turning now descriptively to the drawings, in which similar reference characters denote similar elements throughout the several views, the attached figures illustrate an audio/voice message driven customer interaction queuing system, which comprises client, server and agent elements.

By way of introduction, this discussion refers to 3-party and 2-party service models. In a 3-party model, a server brokers interaction between Users and Agents. In a 2-party model, User-Agent interaction occurs directly.

Figure 1:
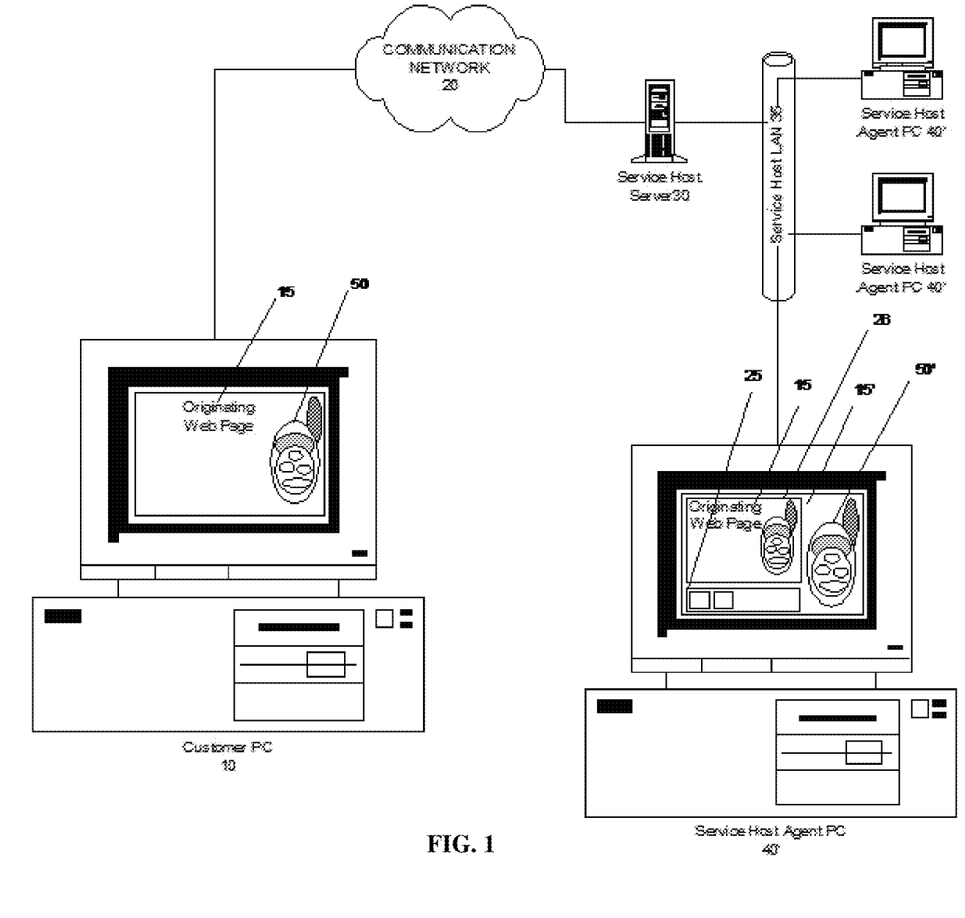
FIG. 1 shows high-level elements of the Blurt service delivery process.

From the overall service level, the preferred 3-party service architecture functions in the following manner: A User visiting a blurt-enabled website creates an audio message using the Blurt Client (FIG. 1, 10, 15, 50). The user then sends the message using the Blurt Client (FIG. 1, 50) to the Blurt Server (FIG. 1, 30). The Blurt Server then determines availability and selects an Agent (FIG. 1, 40') to field the message, and distributes the message to the Agent. The Agent sees the User web page that originated the message (FIG. 1, 40', 15', 15) and can manage multiple concurrent User dialogs by viewing the Connection Management area (FIG. 1, 40', 15', 25). The Agent records responses to the User questions using the Blurt Client (FIG. 1, 40', 15', 50') and sends the message back to the Blurt Server (FIG. 1, 30). The Blurt Server then sends the response on to the User's Blurt Client for playback (FIG. 1, 10, 15, 50).

Figure 2:
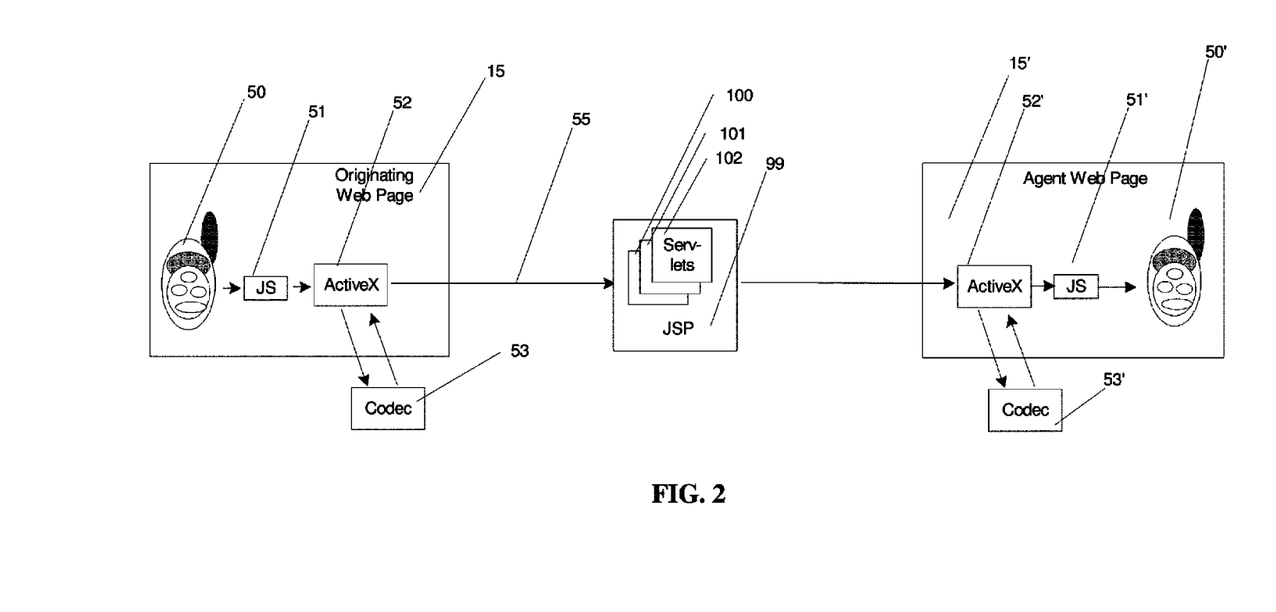
FIG. 2 is a Blurt software component view showing the core elements of the Blurt Client, Blurt Server, and Blurt Agent.
Figure 3:
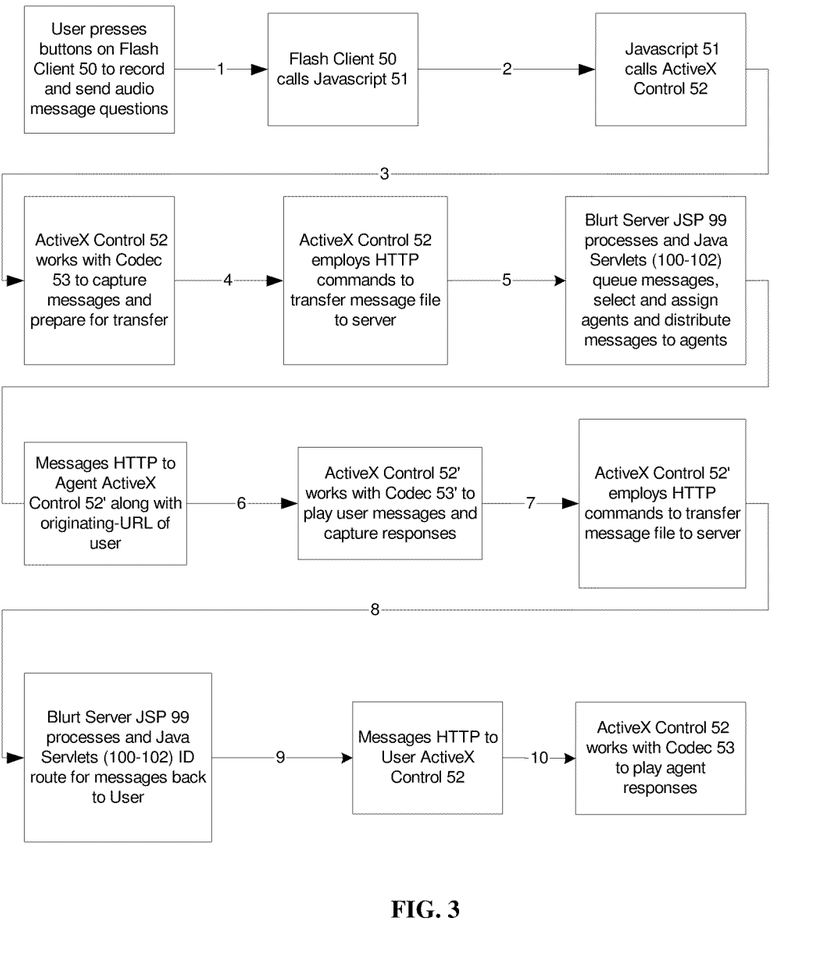
FIG. 3 is a high-level flowchart of the software process for Users to send messages to Agents, and the response path for Agent messages returning to Users.

From the software component level, the preferred 3-party software architecture functions in the following manner: A User visiting a blurt-enabled website creates an audio message using the Blurt Client (FIG. 2, 50, 51, 52, 53). A Flash object (FIG. 2, 50) drives JavaScript (FIG. 2, 51), which in turn controls an ActiveX object (FIG. 2, 52). The ActiveX object employs a Codec (FIG. 2, 53) to capture and store audio files, and sends these to the Blurt Server JSP page (FIG. 2, 99) and Java Servlets (FIG. 2, 100,101,102), which handle disposition of the messages. The Blurt Server then assigns the message to an Agent and transfers the message to the Agent's Client (FIG. 2, 50', 51', 52', 53'). The Agent controls playback using the Flash object (FIG. 2, 50') in a manner similar to the User side, driving JavaScript (FIG. 2, 51'), which in turn controls, an ActiveX object (FIG. 2, 52'). The ActiveX object employs a Codec (FIG. 2, 53') to retrieve and play the audio message, and to capture his response to the User's question, and to send the response back to the Blurt Server (FIG. 2, 99, 100, 101, 102). The Blurt Server then sends the response on to the User's Blurt Client for playback (FIG. 2, 50, 51, 52, 53) in a manner similar to Agent playback.

Figure 4:
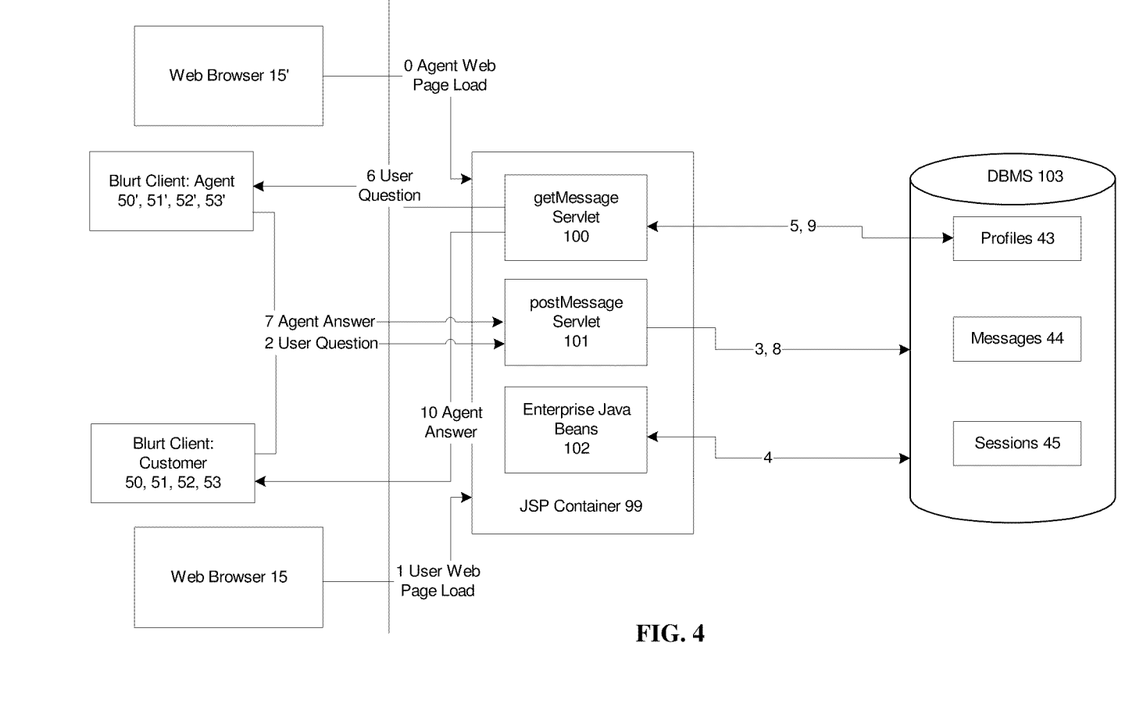
FIG. 4 is a Blurt System View with high-level process flow indicated.
Figure 5:
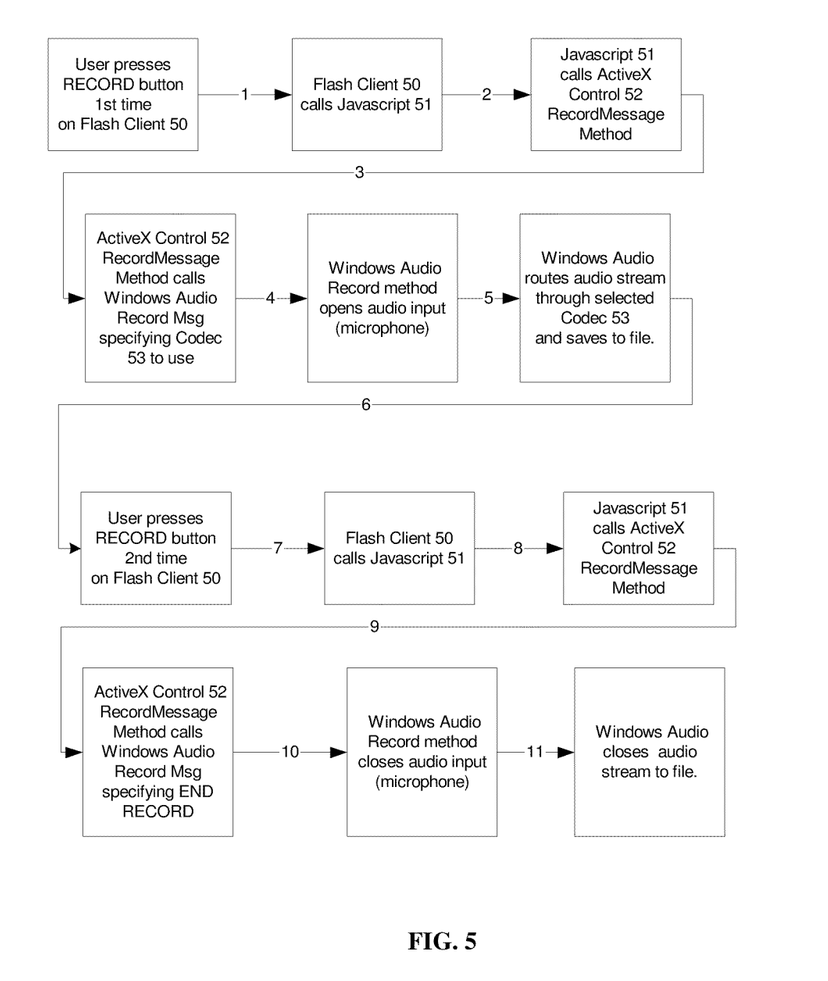
FIG. 5 is a flowchart of the client software process for the "Record" operation of the Blurt client.
Figure 6:
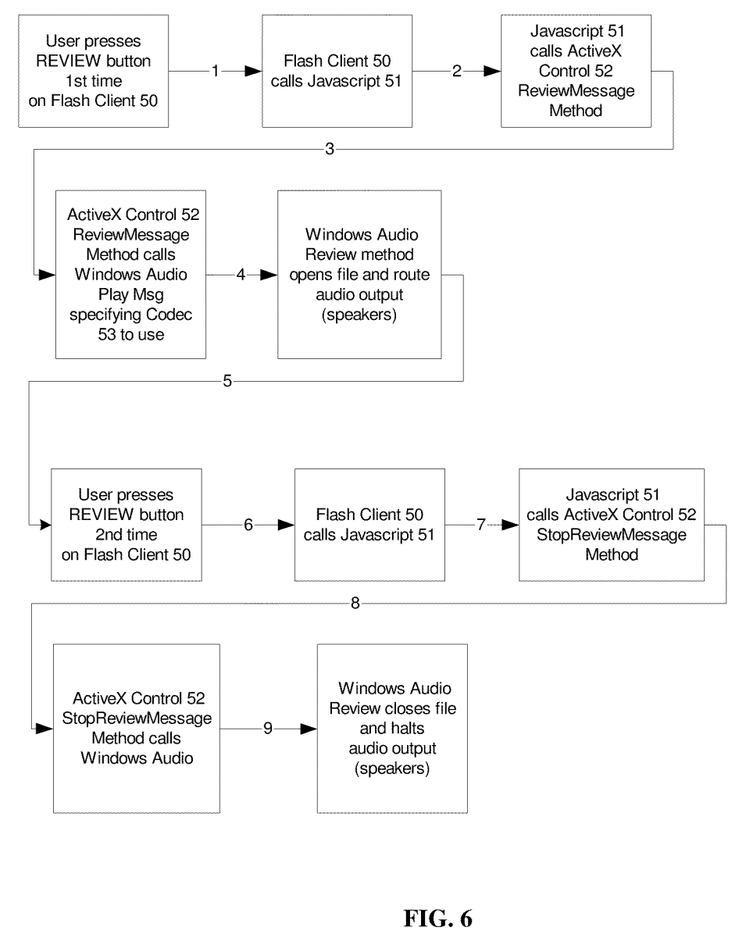
FIG. 6 is a flowchart of the client software process for the "Review" operation of the Blurt client.
Figure 7:
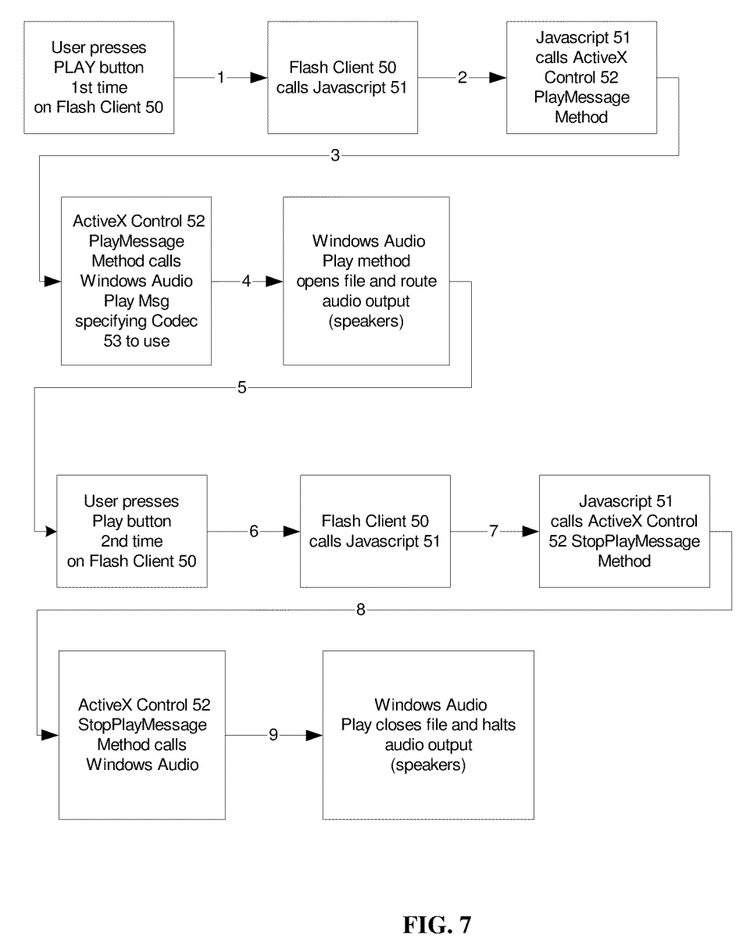
FIG. 7 is a flowchart of the client software process for the "Play" operation of the Blurt client.
Figure 8:
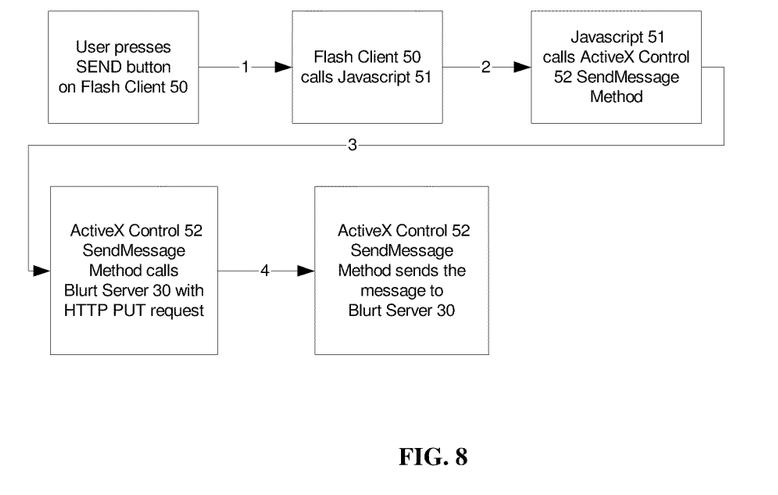
FIG. 8 is a flowchart of the client software process for the "Send" operation of the Blurt client.
Figure 9:
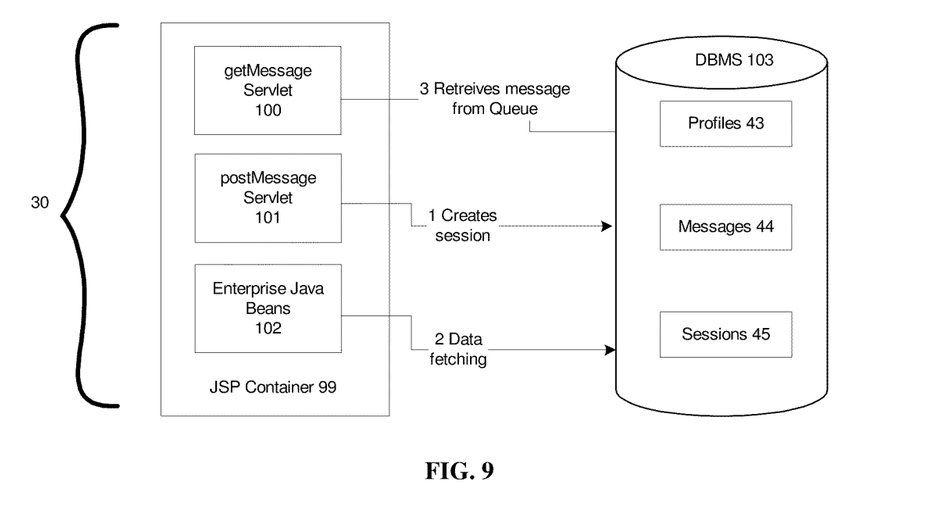
FIG. 9 is a Blurt Server and DBMS architecture diagram with rough process flow.
Figure 10:
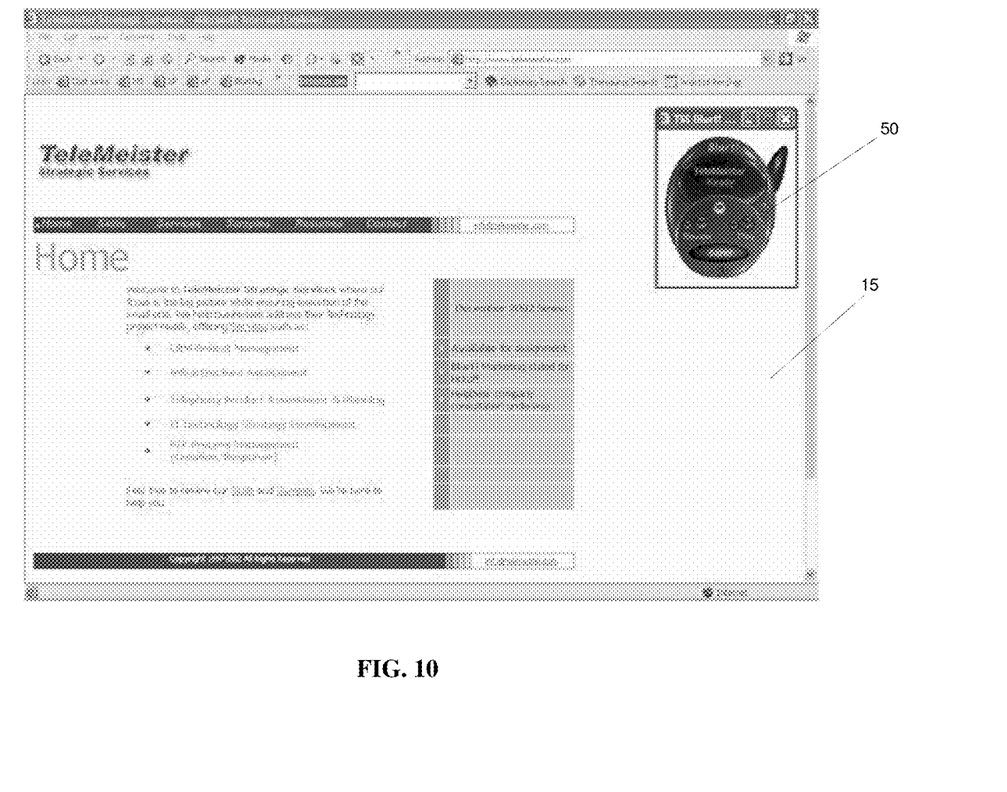
FIG. 10 is a screen capture depicting the Blurt Client embedded in a web page.
Figure 11:
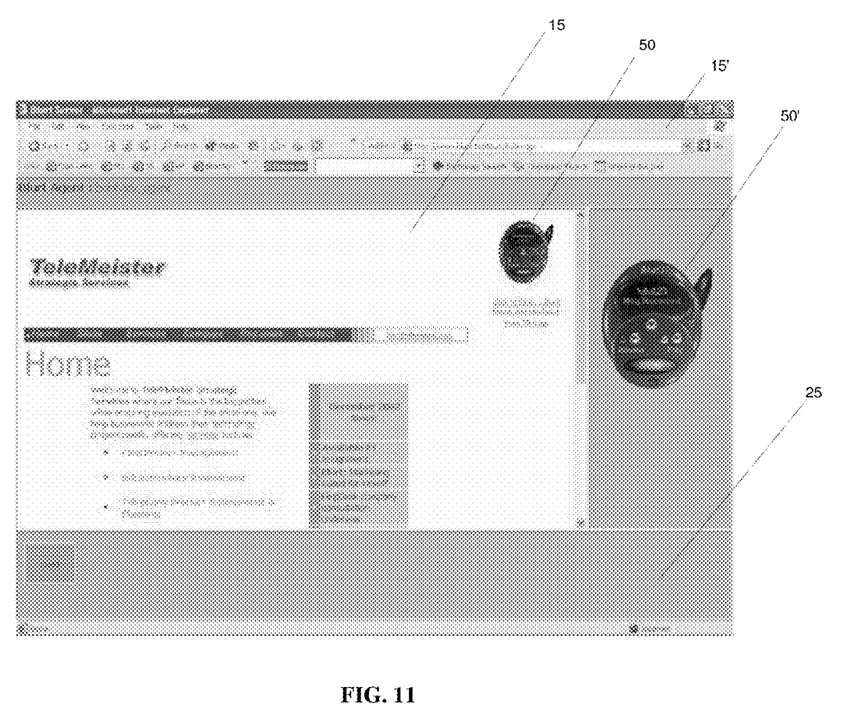
FIG. 11 is a screen capture depicting the Blurt Agent browser interface with embedded Blurt Client.

From the overall system level, the preferred 3-party architecture functions in the following manner: A User visiting a Blurt-enabled site creates an audio message using the Blurt Client (FIG. 4, 50, 51, 52, 53). The ActiveX portion of this client manages the collection and posting (FIG. 4, connector 2) the message to the Blurt Server. On the server side this is handled by the postmessage servlet (FIG. 4, 101). This servlet establishes a connection with the DBMS (FIG. 4, 103) and creates a session (FIG. 4, connector 3, 45) and resulting profile if this is a new contact (FIG. 4, 43). The message is stored in the DBMS (FIG. 4, 44) to await assignment to an agent, or forwarding to an agent if this is part of an existing session. The Blurt Server Bean Explorer classes embedded in JSP processes (FIG. 4, 102, 99) then assess the new contact (FIG. 4, connector 4) and identify an available agent for assignment of the message, or the incumbent agent for the session. If an incumbent has since become unavailable, the JSP process selects a new agent. It then instructs the getmessage Servlet (FIG. 4, 100) to retrieve the message (FIG. 4, connector 5) from the DBMS (FIG. 4, 103, 44) and deliver it to the selected agent for playback (FIG. 4, connector 6) on the Blurt Client (FIG. 4, 50', 51', 52', 53'). Once the Agent has completed recording an audio response, the Blurt Client ActiveX control (FIG. 4, 52') posts the message (FIG. 4, connector 7) to the postmessage servlet (FIG. 4, 101), which in turn inserts it into the DBMS 103 (FIG. 4, connector 8). The getmessage servlet (FIG. 4, 100) then notices the assignment, retrieves it (FIG. 4, connector 9) and delivers the message to the User (FIG. 4, connector 10) for playback on the Blurt client (FIG. 4, 50, 51, 52, 53).

As for more specific details of architecture and operation, the preferred invention consists of the following elements:

The Blurt Client resides in a standard browser on a Personal Computer (PC). The Blurt Client comprises a Macromedia Flash interface driving JavaScript and an ActiveX control and uses standard or custom audio encoding/decoding codecs. The Blurt Server comprises Java Servlets, Enterprise Java Beans, a web and application server and generic database technology. The Blurt Agent consists of a standard browser structured into areas for displaying the User Web Page, Active Connections for the Agent, and the Blurt Client for message playback and recording.

The Blurt Client appears embedded in web pages "enabled" with the Blurt technology. Variations on the Blurt client involve alternatives in each of its components.

The Flash GUI portion of the Blurt Client may be replaced with a Java applet resident in a browser, or as a Java application running outside of a browser on a user desktop. In the event of a Java application, the service model can assume a standard client-server architecture (2-party) and facilitate direct messaging to a host. The Flash GUI may also be replaced by JavaScript, thereby reducing the need for a Flash player in the browser. This reduces GUI functionality however, impacting usability. The JavaScript portion of the Blurt client may be replaced using VB script or another scripting language. Each of these alternatives, however, impacts the userbase, as their ubiquity on User platforms is not assured.

The ActiveX portion of the Blurt Client may be replaced by Java. Java, however, is not as efficient to integrate with Windows audio services and could impact codec operation. Java would, however, promote cross platform operation, and would thereby increase user acceptance. The ActiveX portion of the Blurt Client may be replaced by next generation Microsoft .NET elements. This is a desirable alternative to the instantiation used in reduction to practice, which occurred 13 Feb. 2002. .NET will reduce security-screening issues at client download time, thereby enhancing usability.

In the Codec portion of the Blurt Client, one may substitute a custom codec and include it in the download package at Client download time. This would aid in cross-platform compatibility, but will increase download size, thereby impacting adoption.

Functionally, the Blurt Client may operate in 3-party mode, or 2-party peer-to-peer mode. Reduction to practice focused upon 3-party mode. In either 3-party or 2-party mode, the Blurt Client functions identically from the user perspective. In 3-party mode, messages route to a server, where the server may distribute the message to multiple agents by applying an assignment availability algorithm, or to specific single users with no assignment analysis required. In 2-party mode, User messages route to a single predefined specific user directly. The User may not direct the message routing as this would disrupt the N:1 service model, where N users employ a tool to communicate with 1 Agent. There is no provision for User addressing to allow for addressing to arbitrary recipients. Transport for 2-party Blurt may employ SMTP, or a specially developed light transport client designed expressly for this purpose.

Blurt Client message handling currently employs encoding voice and using HTTP for file transfer. This transfer could alternately employ FTP or another file transfer protocol with no effective difference, other than potential diminished performance. Due to communication delay in file transfer, the preferred method of message handling involves encoding and immediate streaming of said file to the server to reduce perceived transmission time. Blurt Client streaming functionality thus changes the Send command to an implicit "approve and post" command for the message file as it has already, or is already, in transit upon command issuance. Alternative message handling could involve immediate streaming of audio prior to an encoding step, but the resulting file size of the stream would be prohibitive and defeat the gains of early transfer. Alternative message handling could also employ SMTP-style file transfer to effect file transfer to the destination; this would be problematic, however, as variations in User platform configuration may reduce broad applicability.

The Blurt Server consists of Java Servlets, Enterprise Java Beans, a Tomcat server, and generic database technology. It executes JSP pages and business logic related to managing the availability of agents and assignment of user-originated messages that include audio, URL data and user data elements. User messages may include text, fax and video as well. The server also manages audio responses from the Agent, routing, and then delivering them to the originating User's Blurt Client for playback on the User PC.

The Blurt Server may also be implemented with alternate technologies for dynamic page creation and delivery, including ASP, .NET or ColdFusion. These products are not open-source, however, impacting the cost of delivery for the system. The Blurt Server may also employ alternate web and application server technologies including, but not limited to IBM's WebSphere, WebLogic, and Microsoft IIS. These alternatives do not offer substantive advantages to the Blurt Server function, but may suit customers of Blurt due to pre-existence in customer infrastructure.

Functionally, the Blurt Server may operate in 2 modes in a 3-party service model, or be omitted from the system with a modified Blurt Client performing peer-to-peer 2-party communication in a 2-party model. In the 3-party model, messages route to a server, where the server may distribute the message to multiple Agents by applying an assignment availability algorithm (mode 1), or to specific single users with no assignment analysis required (mode 2). In the 2-party model, User messages route to a single pre-defined specific Agent directly. The User may not direct the message routing as this would disrupt the N:1 service model, where N users employ a tool to communicate with 1 Agent. Transport for 2-party Blurt may employ SMTP, or a specially developed light transport client designed expressly for this purpose.

The Blurt Agent consists of a standard browser segmented into areas comprised of the User URL area, the Connection Management area, and the Blurt Client area. These are the basic elements required to enable a rich customer service delivery process.

The Blurt Client area consists of a screen area displaying the Blurt Client player, which is comprised of Macromedia Flash, JavaScript and ActiveX, with reliance upon supplemental codecs for audio record and playback. These codecs may be added to this system by the Operating System itself (as in the case of Windows), or via custom development.

The User URL area consists of a screen area in which the User URL that accompanied the user message is expanded to show the agent from where the message originated in the Blurt enabled website.

The Connection Management area consists of graphical icons indicating user sessions currently assigned to the Agent, and which Customer is in focus in the User URL area undergoing service delivery.

The Blurt Agent may assume innumerable realizations as the core elements may recombine as desired by customers. Each of the core elements may be realized using various technologies, thereby creating a large combination of possible instantiations in varied configurations.

The Blurt Client, comprised of an ActiveX Control (52), a Flash interface (50), and JavaScript (51) working with a supplemental codec (53), is connected among its components as follows:

The Flash Interface (50) of the Blurt Client collects user input in the form of button key presses and mouse hovering. The Flash Interface (50) passes these events to JavaScript (51), which in turn pass the events to an ActiveX Control (52). The ActiveX Control (52) then may interact with Operating System Audio services, supplying an audio file to play, or instructing it to capture audio stream from an input device such as a microphone. The ActiveX Control (50) may also interact with Blurt Server (30) components getmessage (100) and postmessage (101), and may execute HTTP Put, Post and Get commands for transportation and retrieval of audio files, User URL and other User data. The Blurt Client connectivity applies to both User and Agent instantiations of the Blurt Client.

The Blurt Server (30) connectivity consists of Java Servlets interacting with Enterprise Java Beans (102), a web server (Tomcat) server acting as a JSP container (99) and generic database technology (103).

The Java Servlets are comprised of getmessage (100) and postmessage (101) and interact with the ActiveX Control (52) of the Blurt Client. The Java servlets (100, 101) also feed the JSP (99) logic that assigns and delivers user-data-enhanced-messages to agents, and accepts their responses. The Java servlets (100, 101) also interact with subordinate DBMS technology (103) employing JDBC to insert and retrieve records into the database.

The Blurt Server JSP pages (99) interact with the Java servlets to accept and push content to Users and Agents.

On the User Side, the Server (30) pushes audio responses created by Agents, using HTTP (55) to communicate with the User Side browser (15). The Server (30) also communicates through the ActiveX Control (52), and indirectly to JavaScript (51), and indirectly to the Blurt Client Flash interface (50) to manage playback-control-button states, display message information on the Blurt Client Interface (50) for presentation to the User, and to push audio content to the client.

On the Agent Side, the Server (30) employs HTTP to push User URL data to the Agent User URL area (26), and to push Connection Management information to the Connection Management area (25) of the Agent browser. The Server also interacts with the Agent instance of the Blurt Client (50') in the Blurt Client Frame of the Agent browser in the manner described above, with the distinction that the server responds to Agent Play requests for User input by updating the Connection Management area, and by retrieving content corresponding to the User URL, and displaying said content in the User URL area (26) of the Agent browser.

Variations on Blurt interprocess communication would derive from two sources, those being alternate development technology, or alternate Blurt topology in service of 2-party versus 3-party models.

Regarding alternate technology, the Flash GUI (50) portion of the Blurt Client may be replaced with a Java applet resident in a browser, or as a Java application running outside of a browser on a user desktop, or as a JavaScript browser application. This might include RPC-style communication, FTP interaction, and other functional equivalents for use in a conventional client-server model.

If the Flash GUI were indeed replaced by JavaScript or a Java Applet, this would eliminate the need for a Flash plug-in in the browser. Interprocess communication would thus rely upon Java messaging. The JavaScript portion of the Blurt client may be replaced using VB script or another scripting language.

In the event of Java Application or other conventional non-web oriented model, interprocess communication depends upon the design of said tools. Each of these alternatives, however, impacts the userbase, as their ubiquity on Windows platforms is not assured.

As suggested, another alternate instantiation alluded to above arises from the 2-party communication model (versus the 3-party model motivating most of this discussion). This service structure implements N:1 messaging, where N Users may message 1 and only 1 Agent. This is in contrast to the 3-party model that enables multiple Agents to service an arbitrary number of Users. This application is most likely in small businesses such as sole proprietorships, or in small professional practices. The reason this architecture becomes 2-party is that no server is necessary to perform the assignment to the single Agent. This affects connectivity in the following manner: Blurt may then implement a light mail client or leverage a pre-existing mail client on the User and Agent PCs such as MS Outlook Express to perform the file transport function.

The ActiveX portion of the Blurt Client may be replaced by Java. Java, however, is not as efficient to integrate with Windows audio services and could impact codec operation. Java would employ Java messaging to talk to other components. The ActiveX portion of the Blurt Client may also be replaced by next generation Microsoft .NET elements. This is a desirable alternative to that used in reduction to practice in the Blurt Prototype that operated successfully end-to-end-to-end Feb. 13, 2002. Details of this .NET strategy are emerging as of this writing, however, and did not appear to be available for development.

In the Codec portion of the Blurt Client, one may substitute a custom Codec and include it in the download package at Client download time. This would eliminate Windows API calls to the Audio system, replacing them with API calls of the Codec.

The Blurt Server (30) may also be implemented with alternate technologies for dynamic page creation and delivery, including ASP, .NET or ColdFusion. The Blurt Server may also employ alternate web and application server (99) technologies including, but not limited to IBM's WebSphere, WebLogic, and Microsoft IIS. These would employ the interprocess communications peculiar to each platform.

Functionally, a Blurt System may operate in 3-party mode, or 2-party peer-to-peer mode. Reduction to practice focused upon 3-party mode. In either 3-party or 2-party mode, the Blurt Client functions identically from the user perspective.

In 3-party mode, messages route to a server, where the server may distribute the message to multiple agents by applying an assignment availability algorithm, or to specific single users with no assignment analysis required (e.g. a service brokerage between providers and consumers).

Additional variations upon 3-party and 2-party themes assume somewhat academic options entirely motivated by the desire to circumvent the protection this patent application seeks. Some of these include a 3-party system that includes peer-to-peer file transfer of audio and related data initiated but not mediated by a server. Additionally, 3-party solutions could employ SMTP or FTP as a means for file transfer, but do not represent innovation and are again designed to avoid claims herein. Other variations could include conversion of Blurt audio messages into telephony streams directed into a voice mail system or other telephony infrastructure. While this innovation does employ an alternate path, it relies upon the fundamental claim here of premeditated voice message queuing in a customer interaction queuing context, thus infringing claims herein.

Blurt message handling on the client currently employs encoding voice and using HTTP for file transfer. This transfer could alternately employ FTP or another file transfer protocol with no effective difference, other than potential diminished performance. Due to communication delay in file transfer, the preferred method of message handling involves encoding and immediate streaming of the file to the server to reduce perceived transmission time. Blurt Client functionality thus changes the Send command to an implicit "approve and post" command for the message file as it has already, or is already, in transit upon command issuance. This innovation provides marginal transfer time improvement, however, as Blurt generates small audio files, and the inclusion of streaming logic would increase download package size and retard initial client download, diminishing the improvement accordingly in a tradeoff. Alternative message handling could involve immediate streaming of audio prior to an encoding step, but the resulting file size of the stream would be prohibitive and defeat the gains of early transfer. Alternative message handling could also employ SMTP-style file transfer to effect file transfer to the destination; this would be problematic, however, as variations in User platform configuration would reduce broad applicability.

Several additional alternatives present themselves in the realization of Blurt, each being inspired by the innovation presently under examination in this document. These alternatives are in scope for Blurt development, only delayed by race to reduce the core concept to practice, which has occurred.

Some of these innovations include analyzing other User Data and User URL to accomplish routing in the Blurt Server logic. This would allow call centers to triage messages and deliver them to subject experts. Further enhancements along this line would involve speech to text analysis and key word spotting within the audio stream to accomplish the same purpose. Other innovations at the same logic step of the service cycle would facilitate business logic controllable by the host of the system such as "Business Day" rules, versus off hour rules, and auto-audio responses generated during relevant times to manage user expectations when the service is likely to be delayed.

In addition to routing innovation, complementary applications may develop as enabled directly by this core innovation. These are fully anticipated here and claimed, including 3-party incident billing systems, 3-party subscription billing systems, and two party equivalents. Additional applications claimed include ASP hosted 3-party solutions in a service bureau configuration for all variations of systems above and related billing systems.

Additional innovations in the client pertinent to security are also claimed. These may include user authentication and voice encryption, or the employment of digital signatures to establish user identity.

Additional innovations enriching the communication stream are also claimed. These include bundling attachments with messages to aid in the dialog or for other purposes, and creation of a spontaneous customized portal for Users or Agents which house relevant material.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Figure Reference Numerals
Number Item
10 Customer PC
15 Customer browser originating web page
15' Agent browser
20 Communication network
25 Agent browser connection management area
26 Agent browser User URL Area
30 Service host server
35 Service Host LAN
40' Agent PCs
43 Profiles
45 Sessions
47 Messages
50 Customer Flash GUI
50' Agent Flash GUI
51 JavaScript Customer
52 ActiveX Control Customer
53 Media Codec Customer
51' JavaScript Agent
52' ActiveX Control Agent
53' Media Codec Agent
55 HTTP or alternate transfer protocol
99 Java Server Pages (JSP) Container
100 getMessage Java Servlet
101 postMessage Java Servlet
102 Enterprise Java Beans
103 Data Base Management System (DBMS)

I claim:

1. A system for connectionless exchange of electronic messages between a user and a host agent of a customer service center, comprising: a user client application on a user device configured to: locally record and store an audio query message of said user on said user device; transmit said recorded audio query message to a host server by said user client application on the user device; said user client application captures information of a web page browsed by said user when recording said audio query message and transmits said captured web page information along with said stored audio query message to said host server at said customer service center; said host server receiving, distributing and assigning the stored audio query message to said host agent device; and an agent client application on said host agent device configured to record and transmit a response to the user client application; whereby electronic messages are exchanged between the user and the host agent of the customer service center without establishing a direct connection with the host server.

2. The system of claim 1, wherein the transfer of query messages over said network occurs using protocols defined by hypertext transfer protocol or file transfer protocol.

3. The system of claim 1, wherein said host server comprises Java servlets, Enterprise Java Bean component, a web and application server and a generic database technology.

4. The system of claim 1, wherein the agent client application is embedded in each host agent's browser interface.

5. The system of claim 1, wherein the user client application and the agent client application each comprise a graphical user interface and employ standard or custom audio encoding and decoding techniques.

6. The system of claim 1, wherein the user records an audio query message in a browser-resident recorder/player application on the user device, and wherein a host agent response to said audio query message is played back to the user by said recorder/player application.

7. The method of claim 1, wherein said user reviews said recorded audio query message prior to transmission to said host server.

8. A computer program product comprising computer executable instructions embodied in a non-transitory computer-readable storage medium, wherein said computer program product comprises: a first computer parsable program code on a user device configured to: locally record and store an audio query message of a user on said user device; transmit said recorded audio query message to a host server by a user client application on the user device; said first computer parsable program code captures information of a web page browsed by said user when recording said audio query message and transmits said captured web page information along with said stored audio query message to said host server at said customer service center; a second computer parsable program code on said host server configured to receive, distribute and assign said stored audio query message to said host server device; and a third computer parsable program code on a host agent device configured to record and transmit a response to the user client application of said audio query generating user; whereby electronic messages are exchanged between the user and the host agent of the customer service center without establishing a direct connection with the host server.

* * * * *